US011255289B2

(12) United States Patent
Oh et al.

(10) Patent No.: US 11,255,289 B2
(45) Date of Patent: Feb. 22, 2022

(54) METHOD FOR SENSING CLOSING TIME OF INJECTOR USING ARTIFICIAL NEURAL NETWORK AND METHOD FOR CONTROLLING INJECTOR USING THE SAME

(71) Applicants: HYUNDAI MOTOR COMPANY, Seoul (KR); KIA MOTORS CORPORATION, Seoul (KR); HYUNDAI AUTOEVER Corp., Seoul (KR); HYUNDAI KEFICO CORPORATION, Gunpo-si (KR)

(72) Inventors: Se-Do Oh, Seongnam-si (KR); Ji-Hye Kim, Seoul (KR); Hyung-Soo Do, Gunpo-si (KR); Young-Jin Kim, Seoul (KR); Je-Hyeuk Lee, Seoul (KR); Young-Jae Kim, Gunpo-si (KR); Sung-Jae Kim, Gwacheon-si (KR)

(73) Assignees: HYUNDAI MOTOR COMPANY, Seoul (KR); KIA MOTORS CORPORATION, Seoul (KR); HYUNDAI AUTOEVER Corp., Seoul (KR); HYUNDAI KEFICO CORPORATION, Gunpo-si (KR)

( * ) Notice: Subject to any disclaimer, the term of this patent is extended or adjusted under 35 U.S.C. 154(b) by 0 days.

(21) Appl. No.: 16/887,315

(22) Filed: May 29, 2020

(65) Prior Publication Data
US 2021/0199067 A1    Jul. 1, 2021

(30) Foreign Application Priority Data
Dec. 31, 2019   (KR) .................. 10-2019-0179101

(51) Int. Cl.
*F02D 41/40*   (2006.01)
*G06F 17/16*   (2006.01)
(Continued)

(52) U.S. Cl.
CPC .......... *F02D 41/401* (2013.01); *G06F 17/16* (2013.01); *G06N 3/04* (2013.01); *G06N 3/08* (2013.01);
(Continued)

(58) Field of Classification Search
CPC .......... F02D 41/401; F02D 2200/0618; F02D 2041/389; G06N 3/08; G06N 3/04; G06F 17/16
See application file for complete search history.

(56) References Cited

U.S. PATENT DOCUMENTS 8,935,114 B2 *  1/2015  Beer ...................... F02D 41/40
                                                        702/65
9,458,791 B2   10/2016  Park et al.
(Continued)

FOREIGN PATENT DOCUMENTS

KR    10-2015-0114078 A    10/2015

*Primary Examiner* — Joseph J Dallo
*Assistant Examiner* — Kurt Philip Liethen
(74) *Attorney, Agent, or Firm* — Lempia Summerfield Katz LLC

(57) ABSTRACT

A method for sensing a closing time of an injector using an artificial neural network may include: sensing, by a controller, a voltage generated by an injector; performing, by the controller, a preprocess to derive an input matrix using variation characteristics of the voltage; and performing, by the controller, a closing time prediction to derive a closing time of the injector by an artificial neural network model including an input layer including the input matrix, a hidden layer, and an output layer.

5 Claims, 13 Drawing Sheets

(51) Int. Cl.
*G06N 3/08* (2006.01)
*G06N 3/04* (2006.01)
*F02D 41/38* (2006.01)

(52) U.S. Cl.
CPC .............. *F02D 2041/389* (2013.01); *F02D 2200/0618* (2013.01)

(56) References Cited

U.S. PATENT DOCUMENTS

| | | | |
|---|---|---|---|
| 9,964,062 B2* | 5/2018 | Cancellieri | F02D 41/2416 |
| 10,961,945 B1* | 3/2021 | Han | F02D 41/20 |
| 2014/0311457 A1* | 10/2014 | Christ | F02D 41/1402 |
| | | | 123/478 |
| 2015/0275809 A1* | 10/2015 | Shibata | F02D 41/3005 |
| | | | 701/104 |
| 2015/0275814 A1 | 10/2015 | Park et al. | |
| 2017/0306877 A1* | 10/2017 | Ahn | F02D 41/20 |
| 2021/0062744 A1* | 3/2021 | Charbonnel | F02D 41/1405 |

* cited by examiner

METHOD FOR SENSING CLOSING TIME OF INJECTOR USING ARTIFICIAL NEURAL NETWORK AND METHOD FOR CONTROLLING INJECTOR USING THE SAME

CROSS-REFERENCE TO RELATED APPLICATION

This application claims priority to and the benefit of Korean Patent Application No. 10-2019-0179101, filed on Dec. 31, 2019, the entire contents of which are incorporated herein by reference.

FIELD

The present disclosure relates to a method for sensing a closing time of an injector using an artificial neural network and a method for controlling an injector using the same, and more particularly, to a method capable of accurately sensing a closing time of an injector and performing a control to suit the characteristic of the injector using the sensed closing time of the injector.

BACKGROUND

The statements in this section merely provide background information related to the present disclosure and may not constitute prior art.

When a fuel is supplied to an engine of a vehicle, a supplied fuel amount is determined by a control unit (ECU), and the fuel as much as the determined required fuel amount is injected into the engine by an injector, so that the fuel is supplied to the interior of the engine.

The injector is typically composed of a solenoid valve, and is provided for each cylinder. The injector receives a fuel injection signal from the control unit, and injects the fuel for a specific injection time to supply the fuel to the interior of the engine as much as the required fuel amount.

In the related art, injectors have their own drive characteristics that are different from one another depending on injector types or companies. Specifically, as illustrated in FIG. 8A, the injector closing requirement time in accordance with the required fuel amount against a fuel pressure is in a specific linear relationship for each injector type or company. Further, as illustrated in FIG. 8B, the injector closing requirement time and a corresponding injection command time are also in a specific corresponding relationship for each injector type or company. In general, such characteristic information is stored in a memory provided inside the control unit during manufacturing of the vehicle, and then is used to supply the fuel to the interior of each cylinder as much as the required fuel amount.

However, we have discovered that even in the case of the same injectors, the injector drive characteristics thereof may differ from each other due to a difference between the manufacturing tolerance, the tolerance of an output terminal of the control unit for operating the injector, and the corresponding operation current profile. In particular, if deviation of the injector drive characteristics related to the closing time of an injector for each cylinder is not compensated for, the deviation of the closing time between injectors occurs for each cylinder, and a different fuel amount is supplied for each cylinder regardless of the injection command based on the same injection time. That is, it is difficult to perform the same flow control between cylinders.

We have found that in order to correct the deviation between the injection command time and the closing time of an injector for each cylinder as described above, it is desired to correct data related to the existing stored injector drive characteristics, such as the injector drive characteristic curve illustrated in FIG. 8B, by measuring and learning the actual closing time of an injector corresponding to the injection command for each cylinder.

Through such a learning method, the existing injector drive characteristic is compensated for using a characteristic curve obtained by performing interpolation based on the measured data value after receiving a feedback on the actually measured value of the closing time of an injector against a certain injection time when the fuel is injected during an engine driving.

Accordingly, for an accurate fuel injection amount control, it is desired to accurately sense the actual closing time of the injector.

The actual closing time of an injector may be measured using a voltage signal generated from the injector.

FIG. 9 is a graph showing the relationship between an injector opening period that is a period in which a fuel is actually injected from an injector, current being applied to the injector, and a voltage generated from the injector. Referring to FIG. 9, a horizontal axis represents time, and a vertical axis represents levels of current and a voltage, and a fuel amount injected from the injector.

In FIG. 9, period (a) means a dead stroke of a needle of the injector, and it means a period in which the needle is moved by current being applied to the injector, but a fuel injection nozzle is not actually opened.

In order for the injector to inject the fuel, the needle should be lifted, and in order to lift the needle, current should be applied toward a solenoid or a piezo. In order to apply the current, an initial signal is generated, and the current is applied toward the solenoid or piezo of the injector with a predetermined delay time from the initial signal. In this case, the current level is gradually increased, and as illustrated in FIG. 9, the current level reaches the current peak.

Further, as illustrated in FIG. 9, the current has a route in which the current is increased to reach the current peak and then is dropped again, and at a time (injector opening time) after a specific time elapses from the current peak, the needle is lifted to be in a lifted state (state where the fuel is actually injected) for an injector opening period from the injector opening time. However, at the injector opening time, there is no special change in the voltage or current, and thus it is impossible to accurately sense the injector opening time through the typical method in the related art. Accordingly, in the related art, an injector closing time is sensed, and then the injector opening time is estimated through an inverse computation on the sensed injector closing time.

Meanwhile, as illustrated in FIG. 9, the voltage is apt to be abruptly increased and decreased at an initial stage when the current is applied to the injector, and then to be increased again. Thereafter, the voltage is abruptly decreased at a time when the current application to the injector is turned off, and then is abruptly increased again after a specific time delay (section (b), about 0.1 ms). As illustrated in FIG. 9, an inflection point exists on a voltage curve in a section (section (c)) in which the voltage is increased again, and the time when the inflection point exists becomes the time when the needle of the injector is closed and the fuel injection is ended (injector closing time). Accordingly, if the time when the inflection point exists is sensed through the second derivative of the voltage curve, it is possible to sense the injector closing time.

However, it may be difficult to sense the inflection point from the voltage curve in accordance with the injected fuel amount (i.e., injection time). In particular, as illustrated in FIG. 10, a section A in which the injection time is equal to or shorter than a specific time means a micro fuel amount injection section (so called ballistic section) in which a fuel amount m is abruptly increased even if an injector operation time $T_i$ is slightly changed, and in the corresponding section, it is considerably difficult to sense the inflection point from the voltage curve.

SUMMARY

The present disclosure is to overcome the above problems, and the present disclosure provides a method for sensing a closing time of an injector, which can accurately sense the closing time of the injector using an artificial neural network even in a micro fuel amount injection section in which an injection time is equal to or shorter than a specific time, and a method for controlling an injector using the closing time of the injector.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the means as claimed and combinations thereof.

In accordance with the present disclosure to solve the above problems, a method for sensing a closing time of an injector includes: sensing, by a controller, a voltage generated by an injector; performing, by the controller, a preprocess to derive an input matrix using variation characteristics of the voltage; and performing, by the controller, a closing time prediction to derive a closing time of the injector by an artificial neural network model including an input layer including the input matrix, a hidden layer, and an output layer. The controller may be embodied in a hardware manner (e.g., a processor), a software manner, or combination of the hardware and the software manner (i.e., a series of commands), which process at least one function or operation.

According to the present disclosure, it is possible for the controller to accurately sense the closing time of the injector even in a micro fuel amount injection section using the variation characteristics of the voltage generated by the injector and an artificial neural network.

In one form, the variation characteristics of the voltage may be a half-life constant of the voltage, and the half-life constant may be a value calculated by the following equation 1:

$$k = -\frac{t}{\log_2 \frac{V_t}{V_0}} \quad (1)$$

where, $V_t$ is a voltage value V for each measurement point, $V_0$ is a voltage value at an initial measurement point, k is a half-life constant, and t is a time at a measurement point.

In some forms of the present disclosure, the performing of the preprocessing includes: calculating half-life constants at a plurality of measurement time points of the voltage in a specific section; deriving an approximation polynomial for changes in the calculated half-life constants in accordance with the time; and deriving the input matrix by normalizing respective coefficients of the approximation polynomial.

In some forms of the present disclosure, in deriving the approximation polynomial, the coefficients of the approximation polynomial are derived using a normal equation utilizing linear algebra.

In performing the closing time prediction, the hidden layer derives a first preparation matrix by multiplying the normalized input matrix by a first weight matrix and adding a first bias matrix to the multiplied matrix, and the hidden layer derives a first resulting matrix by substituting a transfer function of the following equation for the first preparation matrix, $$a^1 = \frac{2}{1 + e^{-2n^1}} - 1$$

where, $a^1$ is the first resulting matrix, and $n^1$ is the first preparation matrix.

In performing the closing time prediction, the output layer calculates a normalized closing time of the injector by multiplying the first resulting matrix by a second weight matrix and adding a bias value to the multiplied matrix, and the output layer calculates a final closing time of the injector by de-normalizing the calculated closing time of the injector.

In another form of the present, a method for controlling an injector includes: setting, by a controller, a required fuel injection amount; calculating, by the controller, a required injection command time from the set required fuel injection amount; driving, by the controller, the injector based on the required injection command time; sensing, by the controller, an actual closing time of the injector when the injector is driven; correcting, by the controller, the required injection command time using the sensed actual closing time of the injector; and controlling, by the controller, the injector based on the corrected required injection command time. In particular, sensing the actual closing time of the injector includes: performing, by the controller, a preprocess to derive an input matrix using variation characteristics of a voltage generated by the injector; and performing, by the controller, a closing time prediction to derive the closing time of the injector by an artificial neural network model including an input layer including the input matrix, a hidden layer, and an output layer.

In some forms of the present disclosure, the method further includes comparing, by the controller, the required injection command time with a predetermined specific value, wherein when the required injection command time is equal to or shorter than the specific time, the required injection command time is corrected based on the closing time of the injector sensed by the method for sensing the closing time of the injector using the artificial neural network, whereas when the required injection command time exceeds the specific time, the required injection command time is corrected based on the closing time of the injector sensed using an inflection point of a voltage generated by the injector.

In some forms of the present disclosure, the method further includes learning, by the controller, the closing time of the injector for each of a plurality of cylinders, wherein the learning of the closing time of the injector for each of the plurality of cylinders includes: setting an injector injection time that is a target of learning; calculating a closing time corresponding to the set injector injection time from drive characteristics of a nominal injector; performing multi-stage fuel injection including performing learning injection to inject a fuel for the set fuel injection time and injecting the fuel for the closing time corresponding to the fuel amount obtained by excluding the calculated closing time from a target closing time corresponding to an entire injection amount required for an engine driving; sensing the closing time of the injector during the learning injection using the method for sensing the closing time of the injector using the artificial neural network; learning an actual closing time of the injector corresponding to a learning injection time through the performing of the multi-stage fuel injection and the sensing of the closing time of the injector; and ending the learning for the corresponding closing time of the injector when a specific learning completion condition is satisfied, and compensating for the drive characteristics of the injector by reflecting the learning result.

In some forms of the present disclosure, when the injector injection time that is the set target of learning exceeds a specific time, the learning of the closing time of the injector is not performed.

According to the method for sensing the closing time of the injector and the method for controlling the injector using the sensing method, which are configured as described above, it is possible to accurately sense the closing time of the injector using the artificial neural network, even in the micro fuel amount injection section in which it is difficult to sense the closing time in the related art.

Further, through this, it is possible to obtain an accurate characteristic relationship between the actual injector injection time and the closing time requiring the learning, and to improve accuracy of the learning for correcting the deviation of the closing time of the injector, which makes it possible to improve the closing time deviation correction performance for each cylinder. Further, through this, it is possible to improve the fuel amount deviation correction performance between the cylinders, which enables the accurate fuel injection amount control.

It is to be understood that both the foregoing general description and the following detailed description of the present disclosure are exemplary and explanatory and are intended to provide further explanation of the disclosure as claimed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
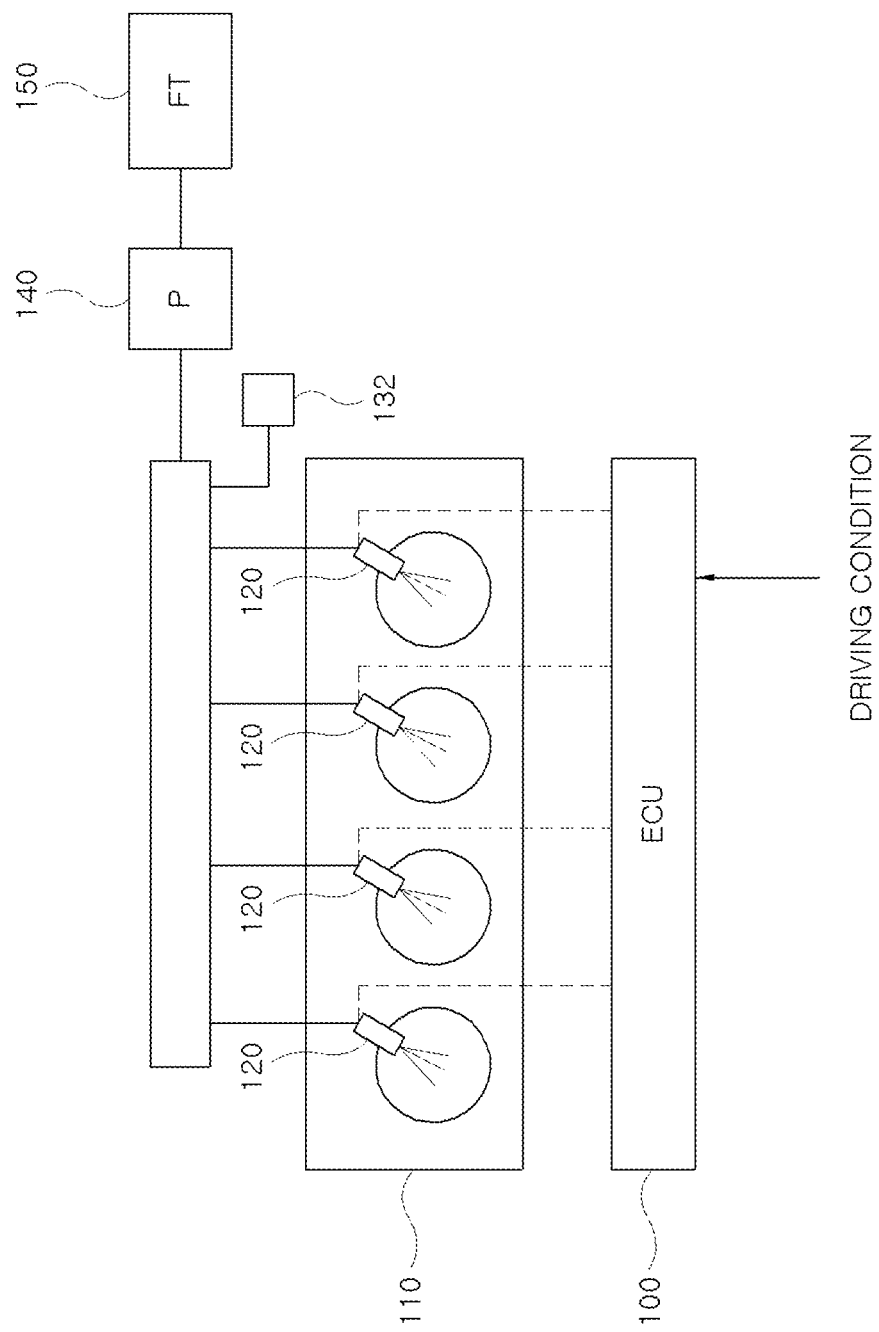
FIG. 1 is a diagram schematically illustrating the configuration of an injector control system in which a method for sensing a closing time of an injector and a method for controlling an injector using the sensing method are performed.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a method for sensing a closing time of an injector and a method for controlling an injector using the same in accordance with exemplary forms of the present disclosure will be described with reference to the accompanying exemplary drawings.

FIG. 1 is a diagram schematically illustrating the configuration of an injector control system in which a method for sensing a closing time of an injector and a method for controlling an injector using the sensing method according to one form of the present disclosure are performed.

Referring to FIG. 1, the injector control system includes a fuel tank 150, a fuel pump 140, a rail 130, a pressure sensor 132, an injector 120, an engine 110, and a controller 100.

The fuel tank 150 is filled with a fuel being used for an internal combustion engine, and the fuel pump 140 pumps the fuel, contained in the fuel tank 150, to the rail. On the rail 130, the pressure sensor 132 for sensing an internal pressure is deployed, and a separate regulator valve (not illustrated) and a return line (not illustrated) are formed.

The fuel pumped to the common rail 130 is distributed to the injector 120, and the injector 120 is deployed corresponding to each cylinder to inject the fuel to combustion chambers of the engine 110.

The controller 100 may set a required fuel injection amount in accordance with a driving condition, for example, an engine rpm and an acceleration pedal signal, and may control an injection command time of the injector corresponding to the set required fuel injection amount.

In one form of the present disclosure, the controller 100 controls the operation of the injector by applying current to the injector 120 for a required injection command time, senses a fuel injection pressure through reception of a pressure signal from the pressure sensor 132, and senses a voltage formed in the injector 120. Further, to be described later, the controller 100 senses a closing time of the injector 120 by variation characteristics of the voltage generated by the injector 120 and an artificial neural network model.

The controller 100 senses the closing time of the injector 120, and can operate an actual fuel injection amount through an opening time, the closing time, and the fuel pressure.

In addition, to be described later, the controller 100 may correct the required injection command time based on the sensed closing time of the injector, and may correct the fuel injection amount of the injector 120 more accurately.

Hereinafter, referring to FIGS. 2 and 3, a method for sensing a closing time of an injector being performed by the controller 100 of FIG. 1 will be described.

Figure 2:
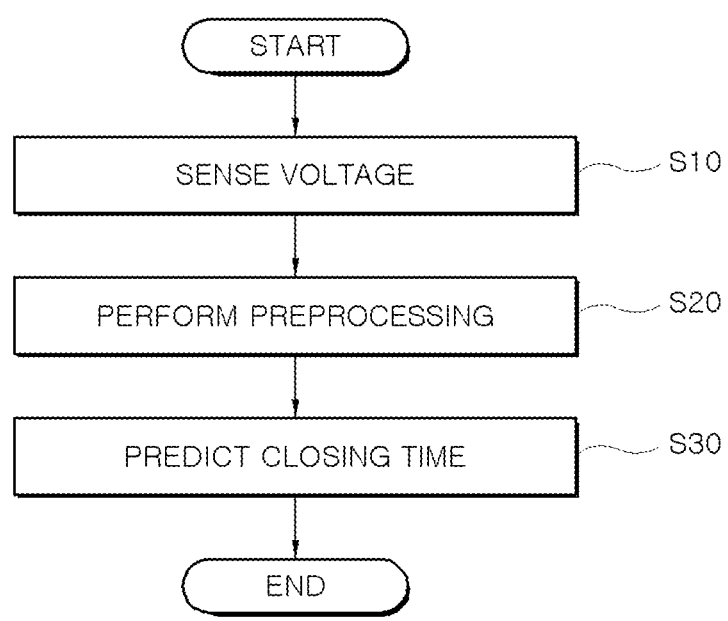
FIG. 2 is a flowchart of a method for sensing a closing time of an injector.
Figure 3:
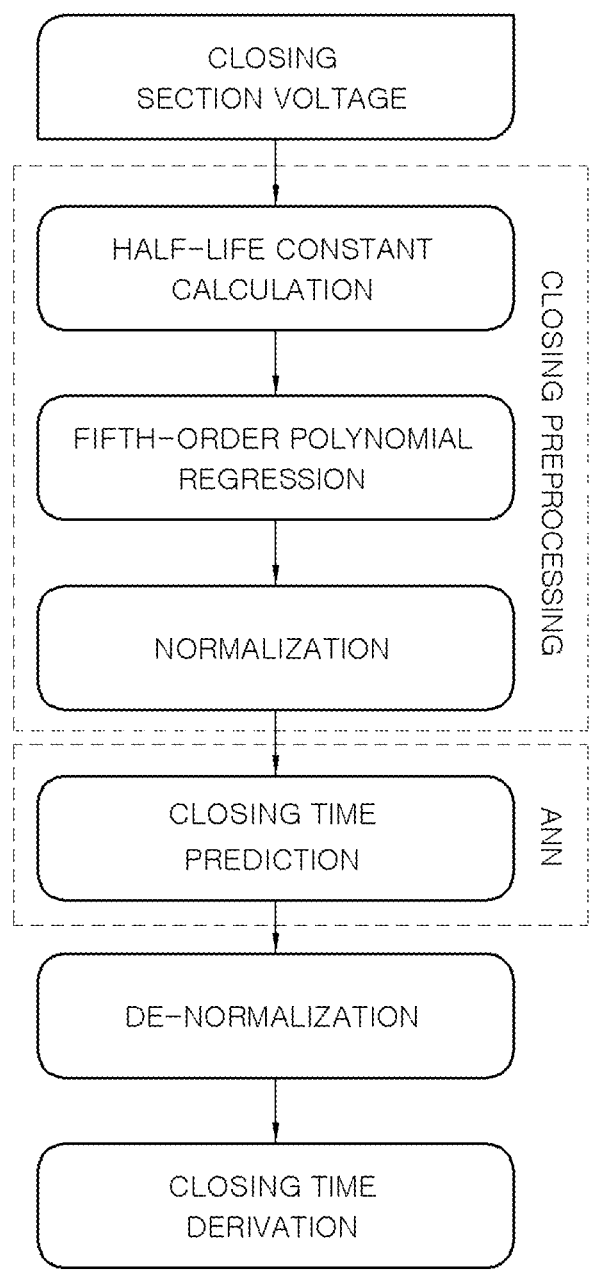
FIG. 3 is a block diagram explaining the method for sensing a closing time of an injector as illustrated in FIG. 2.

FIG. 2 is a flowchart of a method for sensing a closing time of an injector according to one form of the present disclosure, and FIG. 3 is a block diagram explaining the method for sensing a closing time of an injector as illustrated in FIG. 2.

As illustrated in FIG. 2, the method for sensing a closing time of an injector in accordance with the present disclosure includes sensing a voltage generated by an injector (S10), performing preprocessing to derive an input matrix using variation characteristics of the voltage (S20), and performing closing time prediction to derive a closing time of the injector by means of an artificial neural network model including an input layer composed of the input matrix, a hidden layer, and an output layer (S30).

Figure 9:
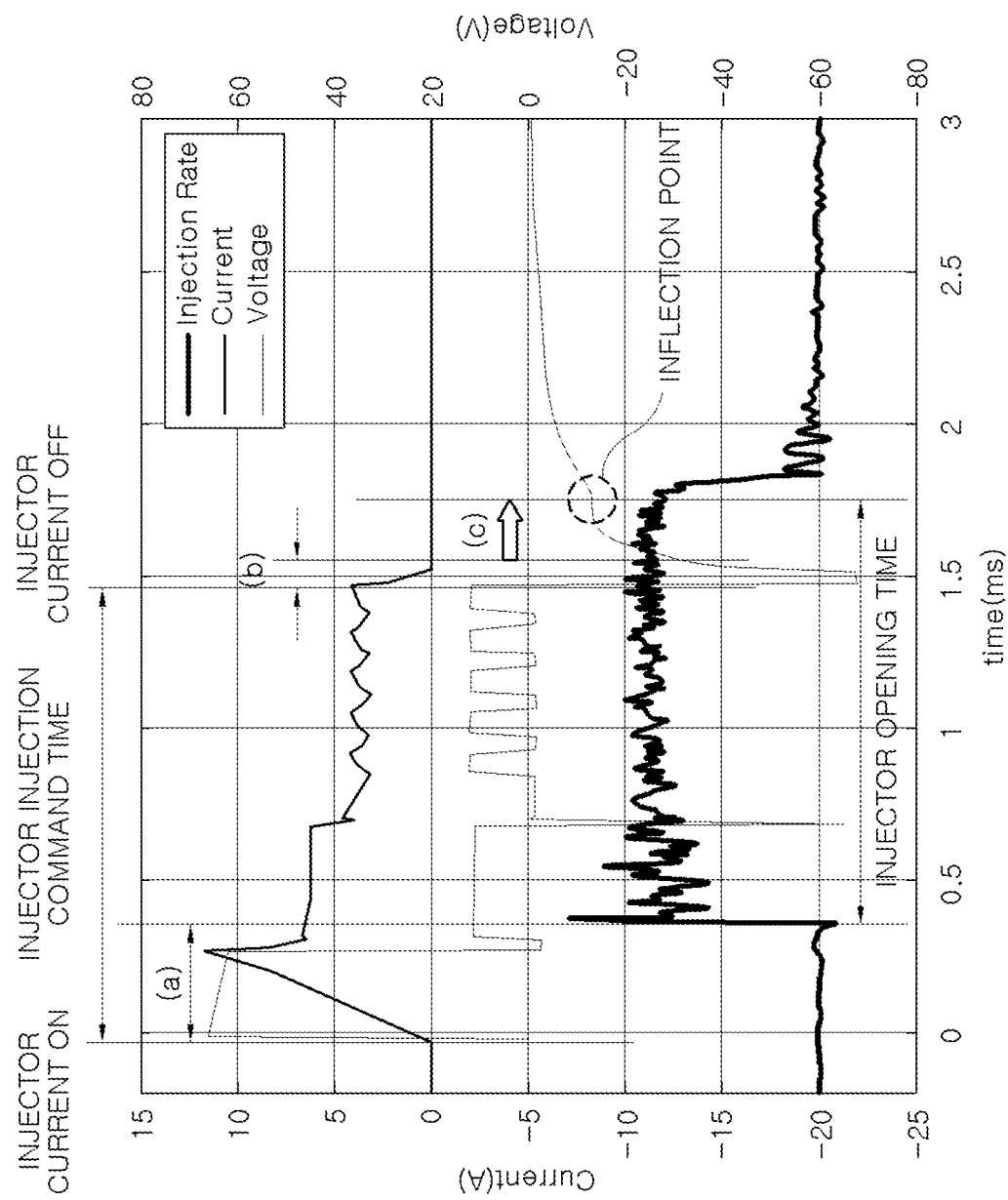
FIG. 9 is a graph showing the relationship between an injector opening period that is a period in which a fuel is actually injected from an injector, current being applied to the injector, and a voltage being generated from the injector.

First, the controller 100 senses the voltage generated by the injector (S10). As illustrated in FIG. 9, when an injection control is ended, a reverse voltage signal is naturally generated from the injector 120. The controller 100 senses the reverse voltage signal using a sensor (not illustrated) or the like.

Next, the controller 100 performs the preprocessing to derive the input matrix using the variation characteristics of the voltage (S20).

Figure 4A:
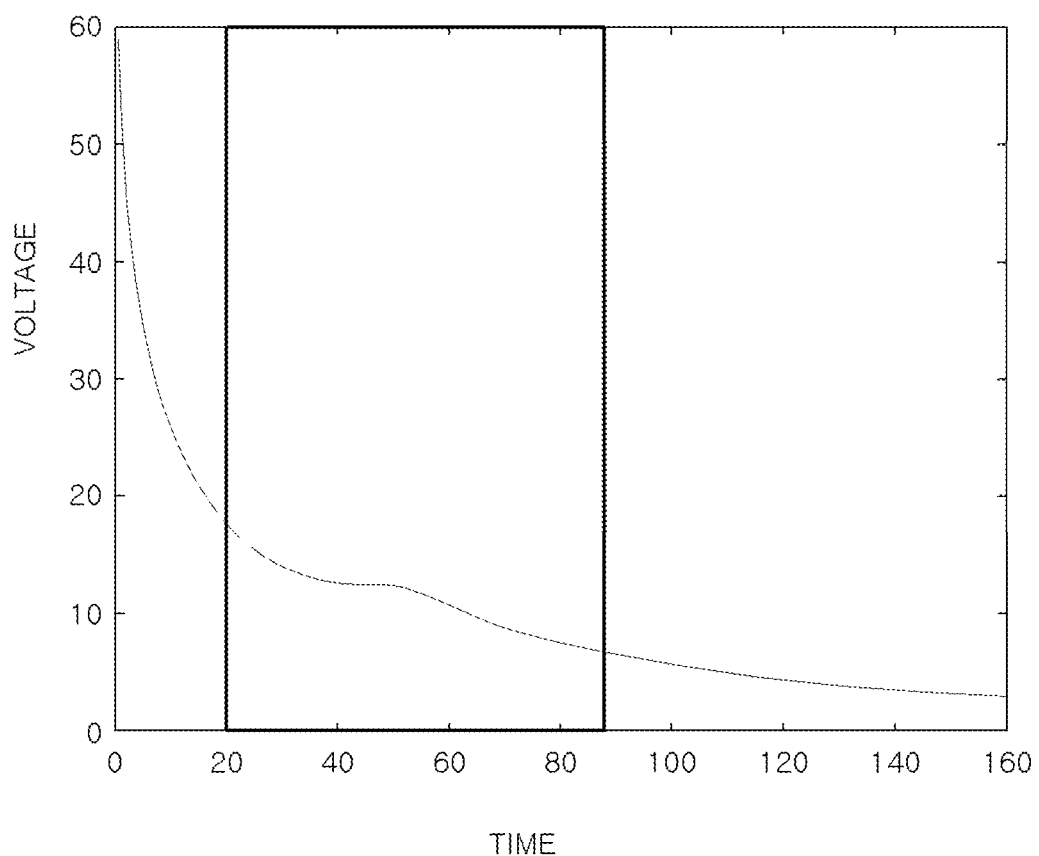
FIG. 4A is a diagram illustrating a voltage section used to sense a closing time of an injector.

During the preprocessing, the controller 100 first selects a voltage section used to sense the closing time of the injector. In FIG. 4A, the selected voltage section is indicated by a rectangle indicated by a thick line. The voltage section is selected as a section in which a probability that the closing time of the injector exists in the entire voltage section is relatively high, and the range of the voltage section can be changed to be reduced in accordance with a calculation capability of an ECU or based on data on the closing time of the injector accumulated by learning. In this case, the calculation amount for sensing the closing time of the injector can be reduced. In the case of the reverse voltage, the measurement value has a negative (−) value, and by substituting a positive (+) value for the negative (−) value, inverted data shown in FIG. 4A can be obtained.

If the voltage section to be used to sense the closing time of the injector is selected, measurement points are set in plural predetermined sections in the corresponding section, a half-life constant is calculated using the voltage values measured at the respective measurement points.

The half-life constant indicates a half-life of the voltage values at the respective measurement points with respect to a voltage value V0 measured at a first start point of a waveform, and the half-life constant may be calculated by the following equation 1, $$k = -\frac{t}{\log_2 \frac{V_t}{V_0}} \quad (1)$$

wherein $V_t$ is a voltage value V for each measurement point, $V_0$ is a voltage value V at an initial measurement point, k is a half-life constant, and t is a time at a measurement point.

Figure 4B:
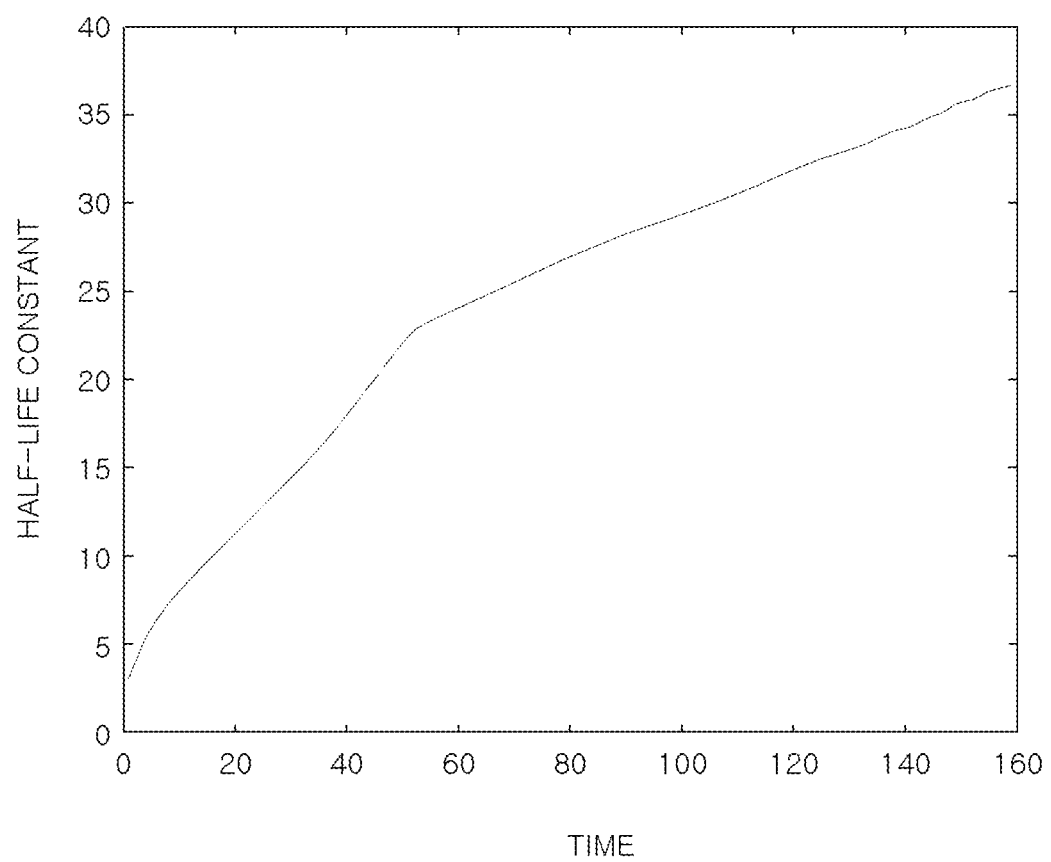
FIG. 4B is a diagram illustrating a waveform K composed of a half-life constant k calculated at each measurement point.

The graph of FIG. 4B is obtained using data on the half-life K calculated at the respective measurement points.

Figure 4C:
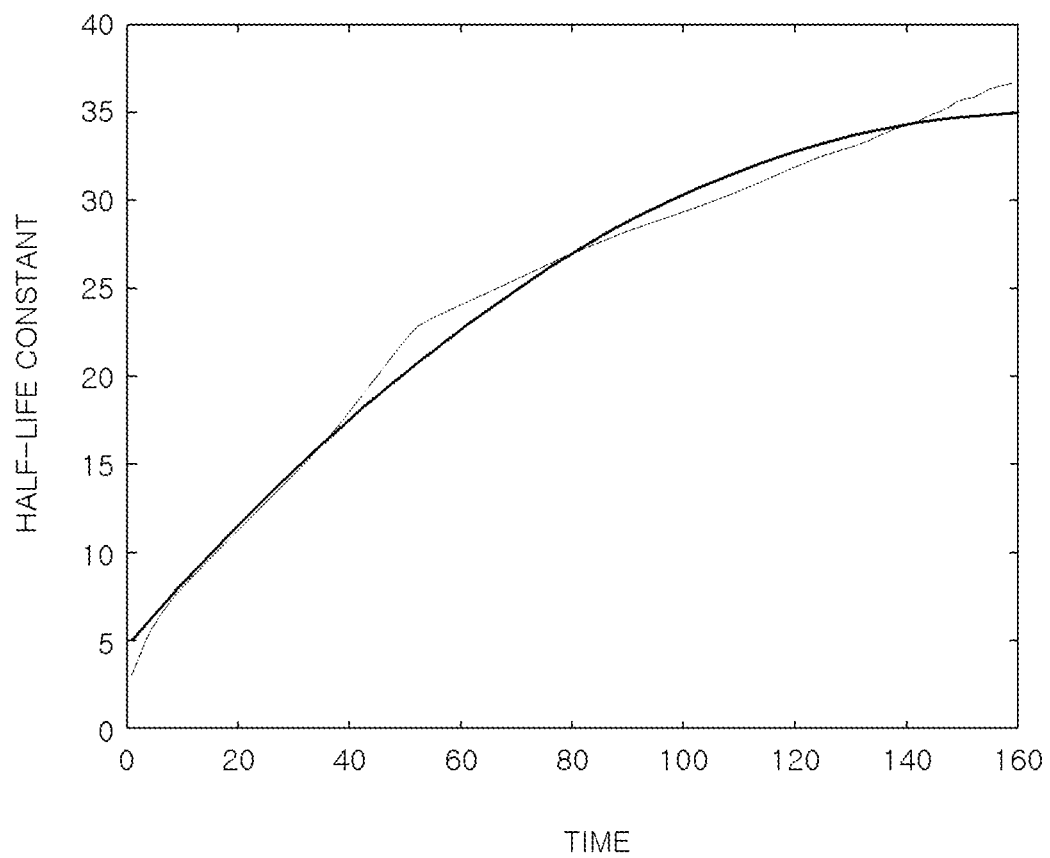
FIG. 4C is a diagram illustrating the result of curve fitting with fifth-order polynomials with respect to the waveform K of FIG. 4B.

Next, the controller 100 derives a polynomial function similar to a waveform K by performing multi-order polynomial regression with respect to the waveform K of the half-life constant illustrated in FIG. 4B. In the present form, as illustrated in FIG. 4C, an error least function of the waveform K is estimated exemplarily using a fifth-order polynomial, and as a result, the following equation 2 is obtained. However, the present disclosure is not limited to the fifth-order polynomial regression, but corresponds to the error least function of the waveforms K. In the case where the ECU has sufficient calculation capability, the ECU may use polynomial regressions higher than fifth-order polynomial regression.

$$k = I_1 x^5 + I_2 x^4 + I_3 x^3 + I_4 x^2 + I_5 x + I_6 \quad (2)$$

As described later, respective coefficients $I_1$ to $I_6$ constituting the equation 2 become input variables constituting an input matrix of an artificial neural network (ANN) model that predicts the closing time.

Meanwhile, in the polynomial regression, as an algorithm estimating the respective coefficients $I_1$ to $I_6$, an optimization algorithm may be generally used. However, due to the realistic limit of the calculation capability of the ECU, it may be difficult to estimate coefficients through performing of the optimization algorithm in some cases. In these cases, the input variables constituting the input matrix can be calculated using the following normal equation 3 utilizing leading algebra.

$$(A^T A)^{-1} A^T k = I \quad (3)$$

In this case, A exemplifies a multi-order term matrix with respect to values (time) on an x axis of FIG. 4B, and if the time t has a value in the range of 1 to 70, the input variables can be calculated by a 6×70 matrix in the following equation 4.

$$\begin{bmatrix} A_{11} & A_{12} & A_{13} & \cdots & A_{16} \\ A_{21} & A_{22} & A_{23} & \cdots & A_{26} \\ A_{31} & A_{32} & A_{33} & \cdots & A_{36} \\ \cdots & \cdots & \cdots & \cdots & \cdots \\ A_{70,1} & A_{70,2} & A_{70,3} & \cdots & A_{70,6} \end{bmatrix} \quad (4)$$

In the case of using matrix A in the above equation 4, an input matrix I composed of the respective coefficients $I_1$ to $I_6$ can be calculated by the following equation 5 (here, k is a half-life constant at each measurement point).

$$\begin{bmatrix} \overset{6 \times 70(A^T)}{A_{11}} & A_{12} & A_{13} & \cdots & A_{1,70} \\ A_{21} & A_{22} & A_{23} & \cdots & A_{2,70} \\ A_{31} & A_{32} & A_{33} & \cdots & A_{3,70} \\ \cdots & \cdots & \cdots & \cdots & \cdots \\ A_{61} & A_{62} & A_{43} & \cdots & A_{6,70} \end{bmatrix} \begin{bmatrix} \overset{70 \times 6(A)}{A_{11}} & A_{12} & A_{13} & \cdots & A_{16} \\ A_{21} & A_{22} & A_{23} & \cdots & A_{26} \\ A_{31} & A_{32} & A_{33} & \cdots & A_{36} \\ \cdots & \cdots & \cdots & \cdots & \cdots \\ A_{70,1} & A_{70,2} & A_{70,3} & \cdots & A_{70,6} \end{bmatrix}^{-1} \quad (5)$$

-continued $$\begin{bmatrix} A_{11} & A_{12} & A_{13} & \cdots & A_{1,70} \\ A_{21} & A_{22} & A_{23} & \cdots & A_{2,70} \\ A_{31} & A_{32} & A_{33} & \cdots & A_{3,70} \\ \cdots & \cdots & \cdots & \cdots & \cdots \\ A_{61} & A_{62} & A_{43} & \cdots & A_{6,70} \end{bmatrix}_{6\times 70(A^T)} \begin{bmatrix} k_{11} \\ k_{21} \\ k_{31} \\ k_{41} \\ k_{51} \\ k_{61} \\ k_{71} \\ k_{81} \\ \cdots \\ k_{70,1} \end{bmatrix}_{70\times 1(k)} = \begin{bmatrix} I_1 \\ I_2 \\ I_3 \\ I_4 \\ I_5 \\ I_6 \end{bmatrix}_{6\times 1(I)}$$

In the case of calculating the input matrix I using a waveform in which the extraction time (value on the x axis) is constant, by using the above-described method, the value of $(A^TA)^{-1}A^T$ on the left side of equation 5 can be pre-calculated, and thus the calculation amount can be reduced during the multi-order polynomial regression type estimation. Further, the calculation amount is always constant, and thus a stable control becomes possible in comparison with the optimization algorithm method.

If the input matrix I composed of the coefficients $I_1$ to $I_6$ of the polynomial is calculated through the multi-order polynomial regression, the input matrix I is normalized using the following equation 6.

$$(Norm.)I_{i,j} = \frac{(\text{old})I_{i,j} - I_{minj}}{I_{maxj} - I_{minj}} \quad (6)$$

Here, (Norm.) $I_{i,j}$ is a normalized input matrix I in the corresponding learning feature, and (Old) $I_{i,j}$ is an input matrix I calculated by the equation 5 in the corresponding learning feature.

Further, values of $I_{max}$ and $I_{min}$ are determined from a maximum-minimum value table for each learning feature obtained through plural times of learning. For example, if data on n×6 input matrix I are obtained through n times of learning, the values of $I_{max}$ and $I_{min}$ in each learning feature are obtained as follows from the corresponding data.

$$\begin{bmatrix} I_{11} & I_{12} & I_{13} & \cdots & I_{1,6} \\ I_{21} & I_{22} & I_{23} & \cdots & I_{2,6} \\ I_{31} & I_{32} & I_{33} & \cdots & I_{3,6} \\ \cdots & \cdots & \cdots & \cdots & \cdots \\ I_{0,1} & I_{0,2} & I_{0,3} & \cdots & I_{0,6} \end{bmatrix} \Longrightarrow \begin{bmatrix} I_{min1} & I_{min2} & I_{min3} & \cdots & I_{min6} \\ I_{max1} & I_{max2} & I_{max3} & \cdots & I_{max6} \end{bmatrix}$$

As described above, by deriving the normalized input matrix Norm.I, the performing of the preprocessing (S20) is ended.

If the performing of the preprocessing (S20) is ended, the controller 100 performs closing time prediction to derive the closing time of the injector 120 by the artificial neural network model including an input layer composed of the calculated input matrix Norm.I, a hidden layer, and an output layer.

Figure 5:
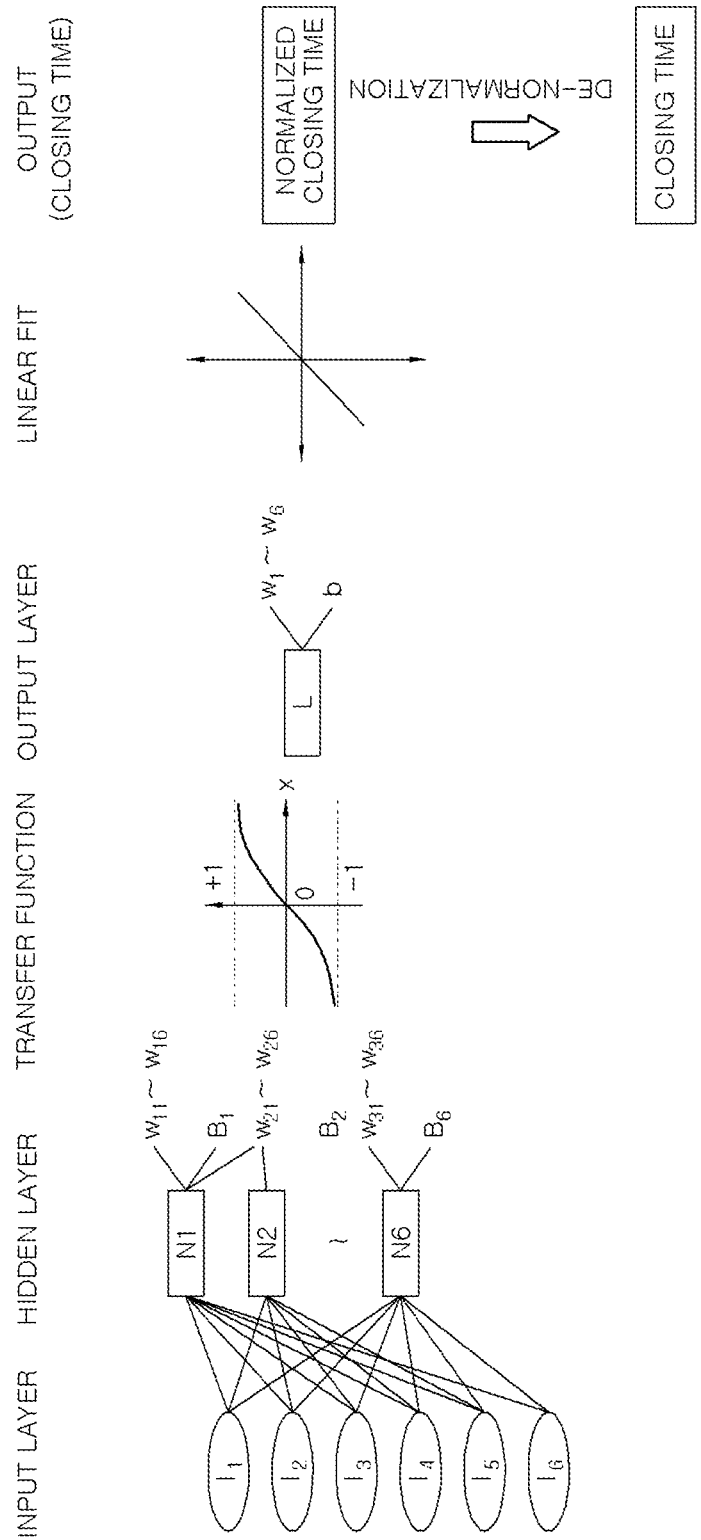
FIG. 5 is a block diagram illustrating an operation logic including an artificial neural network model composed of an input layer, a hidden layer, and an output layer.

FIG. 5 illustrates an operation logic including an artificial neural network model composed of an input layer, a hidden layer, and an output layer. The artificial neural network (ANN) model is a mathematical model having a target to express several characteristics of brain function with computer simulations. The artificial neural network indicates a general model having a problem solution capability, in which an artificial neuron (node) forming a network in combination with a synapse changes the synapse combination strength through learning.

In the artificial neural network, there are supervised learning that becomes optimized to a problem through an input of a supervisory signal (correct answer) and unsupervised learning that does not require the supervisory signal. If there is a clear solution, the supervised learning is used, whereas in the case of data clustering, the unsupervised learning is used. As a result, in order to reduce all dimensions, through the artificial neural network, it is possible to frequently obtain a better response with a relatively small calculation amount with respect to a problem that is unable to be linearly separated due to data with multi-dimensional amount, such as images or statistics. Accordingly, the artificial neural network is applied to various fields, such as pattern recognition or data mining. The artificial neural network may be configured using a special computer, but is implemented by an application software in most general computers.

Basically, the artificial neural network model is composed of an input layer, a hidden layer, and an output layer. In the block diagram of FIG. 5, a calculation order in accordance with such three-stage layers is illustrated.

First, as illustrated in FIG. 5, values input to the input layer are constructed in the form of a matrix, and the input matrix Norm.I normalized in the performing of the preprocessing is input as an input value of the input layer. Here, as described above, $I_1$ to $I_6$ are coefficients of a polynomial obtained through the multi-order polynomial regression of the waveform K. As illustrated in FIG. 5, in the present form, a fifth-order polynomial is used for the multi-order polynomial regression, and the input matrix Norm.I is a 6×1 matrix composed of 6 input variables.

Further, as shown in FIG. 5 and the following equation 7, the hidden layer derives a first preparation matrix $n^1$ composed of N1 to N6 by multiplying the normalized input matrix Norm.I by a first weight matrix W1 and adding a first bias matrix b1 to the multiplied matrix.

$$\begin{bmatrix} W_{11} & W_{12} & W_{13} & \sim & W_{16} \\ W_{21} & W_{22} & W_{23} & \sim & W_{26} \\ W_{31} & W_{32} & W_{33} & \sim & W_{36} \\ \wr & \wr & \wr & \wr & \wr \\ W_{61} & W_{62} & W_{63} & \sim & W_{66} \end{bmatrix} \begin{bmatrix} I_1 \\ I_2 \\ I_3 \\ \wr \\ I_6 \end{bmatrix} + \begin{bmatrix} B_1 \\ B_2 \\ B_3 \\ \wr \\ B_6 \end{bmatrix} = \begin{bmatrix} N_1 \\ N_2 \\ N_3 \\ \wr \\ N_6 \end{bmatrix} \quad (7)$$

first weight matrix W1    Norm. I             first preparation matrix $N^1$
                                    first bias matrix b1

Here, the first weight matrix W1 and the first bias matrix b1 are previously prepared matrix values that are acquired through experiments in a design process before the operation logic is installed in the controller 100 of a vehicle.

Further, the hidden layer derives a first resulting matrix $a^1$ by substituting a transfer function of the following equation 8 for the first preparation matrix $n^1$ according to the following equation 8, $$a^1 = \frac{2}{1+e^{-2n^1}} - 1 \quad (8)$$

where, $a^1$ is the first resulting matrix, and $n^1$ is the first preparation matrix.

Next, the output layer calculates a normalized injector closing time $C.T_{normal}$ by multiplying the derived first resulting matrix $a^1$ by a second weight matrix W2 and adding a bias value b to the multiplied matrix. Here, the second weight matrix W2 and the bias value b are also values acquired through experiments in the design process before the operation logic is installed in the controller 100 of the vehicle, and are values acquired through several times of learning so that the closing time of the injector can be derived from the characteristics of a voltage curve (in the present form, the half-life constant of the voltage).

$$\underset{\substack{\text{second weight}\\\text{matrix } W2\\ [w_1 \sim w_6]}}{} \underset{\substack{\text{first resulting}\\\text{matrix } a^1}}{\begin{bmatrix} L_1 \\ \wr \\ L_6 \end{bmatrix}} + b = C.Tnorm \qquad (9)$$

If the normalized injector closing time $C.T_{normal}$ is calculated, the controller 100 calculates a final injector closing time C.T by performing de-normalization, as in the following equation 10, using the maximum value $C.T_{max}$ and the minimum value $C.T_{min}$ of the closing time of the injector obtained through the learning.

$$C.T = C.Tnorm \times (C.Tmax - C.Tmin) + C.Tmin \qquad (10)$$

Through the above-described process, the controller 100 derives the closing time of the injector using the artificial neural network.

Hereinafter, referring to FIGS. 6 and 7, a method for controlling an injector, being performed by the controller 100 of FIG. 1, will be described.

Figure 6:
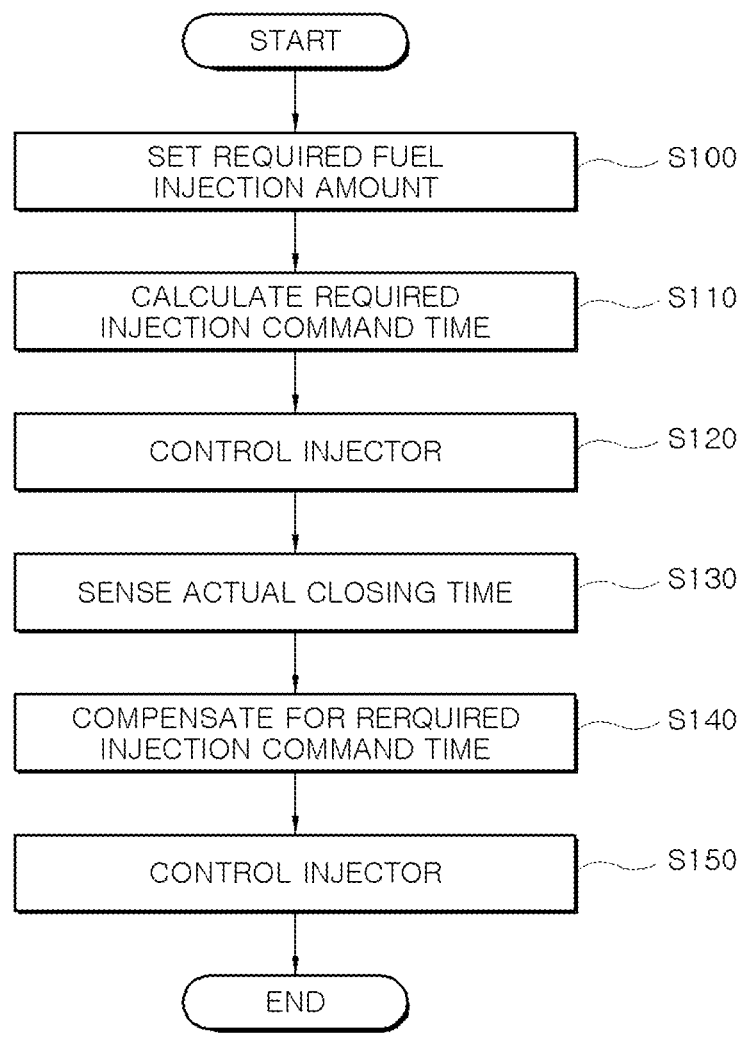
FIG. 6 is a flowchart of a method for controlling an injector using the method for sensing a closing time of an injector illustrated in FIG. 2.
Figure 7:
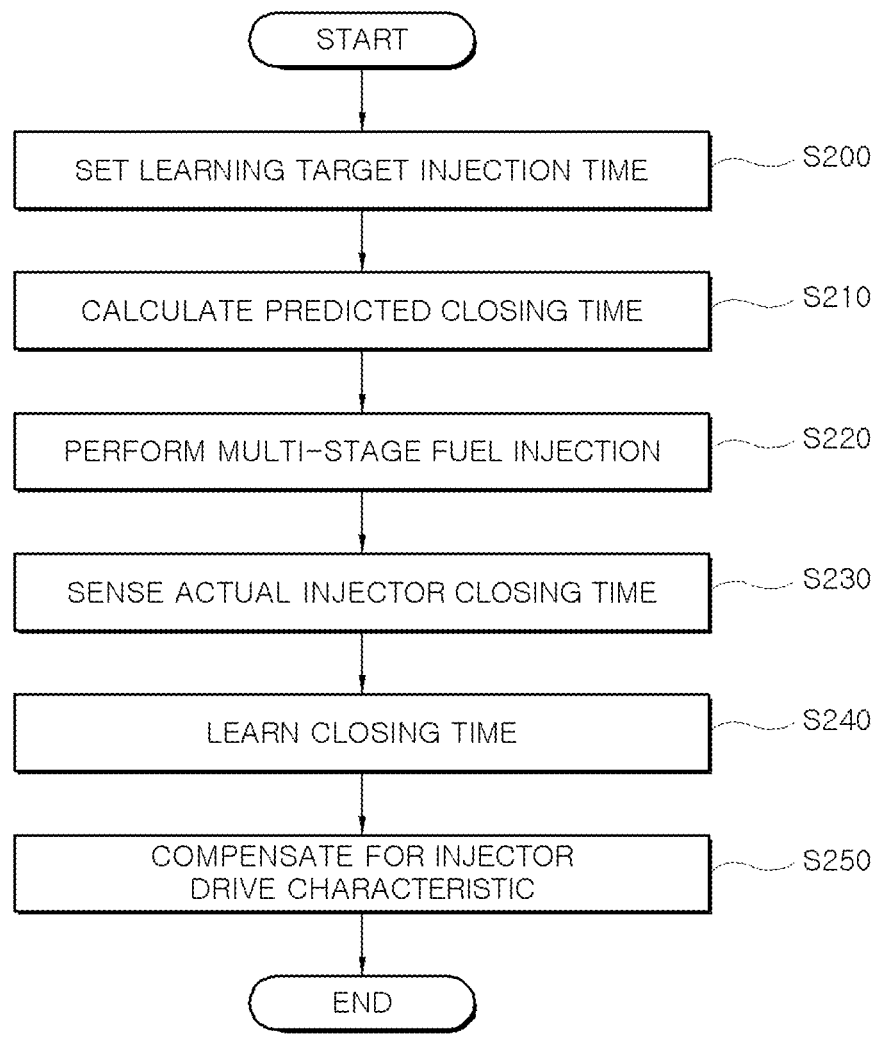
FIG. 7 is a flowchart of a method for learning a closing time of an injector being executed in the method for controlling an injector as illustrated in FIG. 6.
Figure 8A:
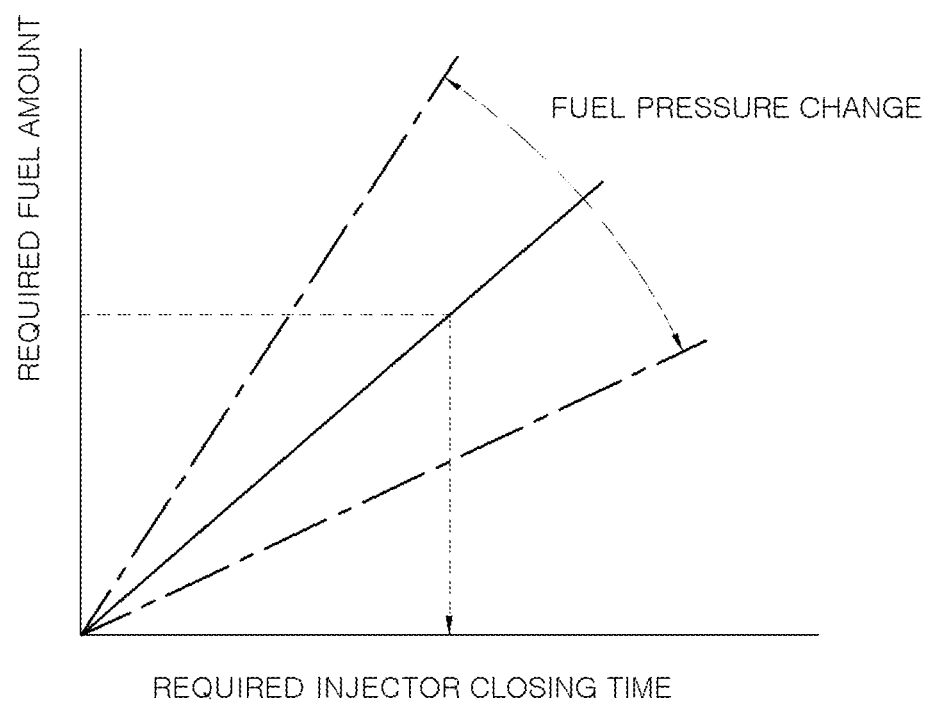
FIGS. 8A to 8B are graphs illustrating injector drive characteristics.
Figure 8B:
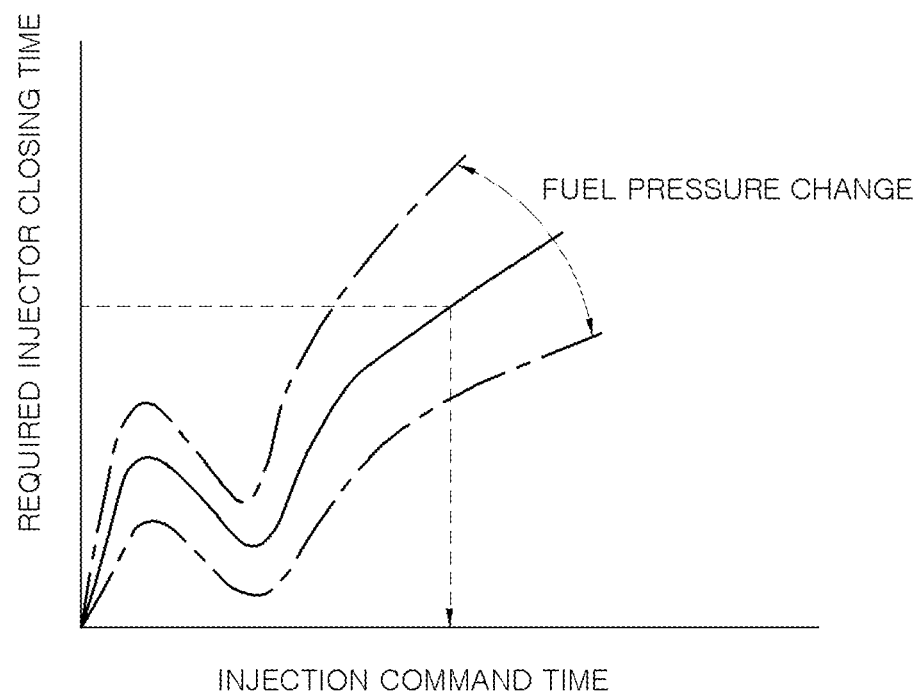

FIG. 6 is a flowchart of a method for controlling an injector according to one form of the present disclosure using the method for sensing a closing time of an injector illustrated in FIG. 2, and FIG. 7 is a flowchart of a method for learning a closing time of an injector being executed in the method for controlling an injector illustrated in FIG. 6.

As illustrated in FIG. 6, first, the controller 100 sets a required fuel injection amount in accordance with a driving condition, for example, an engine rpm and an acceleration pedal signal (S100).

If the required fuel injection amount is set at S100, the controller 100 calculates a required injection command time corresponding to the required fuel injection amount (S110).

For this, the controller 100 may calculate the required injection command time directly from the required fuel injection amount based on predetermined characteristic curves and fuel pressure values related to the required injection command time corresponding to the required fuel injection amount.

The above-described characteristic curves are predetermined based on a nominal injector, and are stored in the form of a map in a storage device (not illustrated) provided in the controller 100.

If the required injection command time is calculated at S110, the controller 100 drives the injector 120 by applying current to a solenoid valve of the injector 120 during the required injection command time (S120).

If the injector 120 is driven at S120, the controller 100 senses an actual closing time of the injector 120 at that time (S130).

In order to sense the actual closing time of the injector 120, the controller 100 uses the method for sensing the closing time of the injector, which is described above with reference to FIGS. 2 to 5. If the actual closing time of the injector 120 is sensed using the above-described artificial neural network (ANN), the controller 100 compensates for the required injection command time using the sensed actual closing time (S140).

For example, the controller 100 can correct the required injection command time, calculated at S110, by directly calculating the required fuel injection amount corresponding to the actual closing time of the injector 120 based on the characteristic curve, related to the relationship between the closing time of the injector 120 and the required injection command time, and the fuel pressure value measured by the pressure sensor 132.

If the required injection command time is corrected at S140, the controller 100 controls the injector 120 based on the corrected required injection command time (S150). That is, if the actual injection command time calculated at S140 is longer than the required injection command time calculated at S110, this means that the fuel is being injected in an amount larger than the required fuel injection amount, and thus the controller 100 controls the injection command time to be reduced.

In another form of the present disclosure, the method further includes comparing the required injection command time calculated at S110 with a predetermined specific value, and the method for sensing the actual closing time may be changed based on the result of the comparison.

Figure 10:
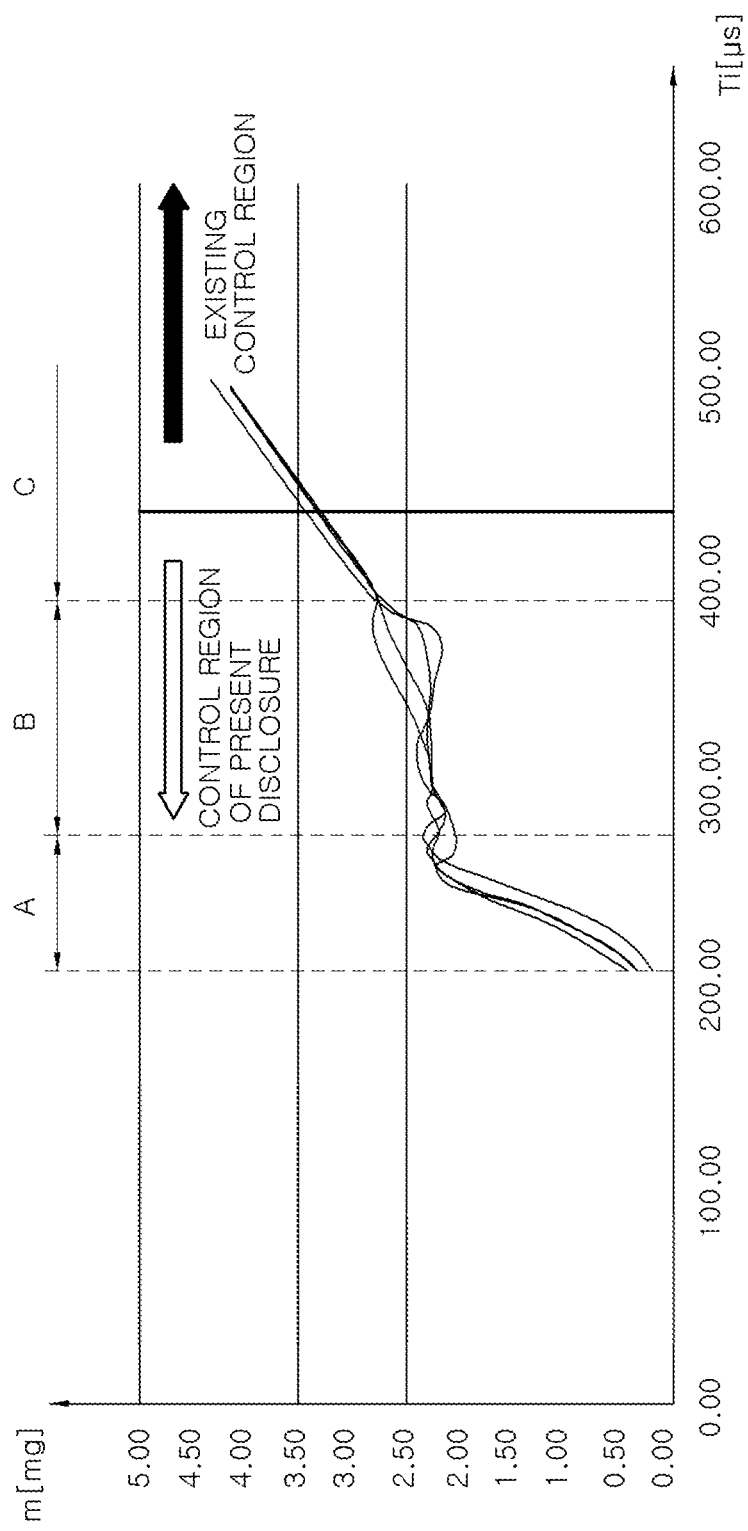
FIG. 10 is a graph illustrating changes in a fuel amount m for each section in accordance with an injector operation time $T_i$.

For example, if the required injection command time is equal to or smaller than the specific value, the required injection command time is corrected at S140 based on the closing time of the injector sensed by the method for sensing the closing time of the injector using the artificial neural network (ANN) illustrated in FIGS. 2 to 5. Referring to FIG. 10, in a ballistic section in which the fuel amount m is abruptly increased even if the injector operation time $T_i$ is slightly changed and in a transient section in which the fuel amount is not greatly changed in accordance with the change in the operation time $T_i$, it is difficult to accurately sense the closing time by the method for sensing the closing time of the injector in the related art. Accordingly, in the above-described sections, it is more desired to use the method for sensing the closing time of the injector using the artificial neural network.

Meanwhile, if the injection command time exceeds the specific value, the required injection command time is corrected at S140 based on the injector closing time sensed using an inflection point of the voltage generated by the injector.

Referring to FIG. 10, in a linear section in which the fuel amount m is linearly changed in accordance with the operation time $T_i$ (i.e., in a section in which a needle of the injector is fully lifted), it is relatively easy to calculate the closing time of the injector from the voltage curve generated by the injector 120. Accordingly, in the corresponding section, in consideration of the calculation capability of the ECU, it is more desired to sense the closing time using the inflection point of the voltage generated from the injector 120 rather than the artificial neural network. For this, the inflection point is derived through the second derivative of the curve of the voltage generated from the injector 120, and the time point when the corresponding inflection point exists is considered as the closing time point of the injector 120.

FIG. 7 is a flowchart of a method for learning a closing time of an injector being executed in the method for controlling an injector illustrated in FIG. 6. By performing a learning method illustrated in FIG. 7, the characteristic curve being used for the method for controlling the injector illustrated in FIG. 6 can be properly corrected. Accordingly, more accurate fuel injection amount control may be performed through the above-described learning.

As illustrated in FIG. 7, for the learning, the controller 100 first sets an injector injection time that is a target of learning (S200). The target of learning is the injector injection time requiring the learning in order to reduce the deviation of the closing time of the injector, and the learning of the closing time of the injector in a low flow section (i.e., above-described ballistic section or transient section) that requires a precise control has a high necessity. In one form, if the injector injection time that becomes the object of the learning exceeds the specific time (e.g., in the case of the linear section in which the needle of the injector is fully lifted), the necessity of learning is relatively low, and the learning of the injector closing time to be described later may not be performed.

After the injector injection time that is the target of learning is set, a predicted closing time is calculated, which corresponds to the injector injection time set from the drive characteristic data of the injector prescribing the relationship between the injector injection time for each cylinder and the closing time, being stored in the existing nonvolatile memory (S210).

If the predicted closing time corresponding to the injector injection time that is the target of learning is calculated, the fuel is primarily injected for the predicted closing time, and then a multi-stage fuel injection is performed for each cylinder to secondarily inject the remaining fuel obtained by excluding the fuel amount, consumed during the primary injection, from the entire required injection amount required for the engine driving (S600).

That is, in order to perform the learning, the controller 100 switches the fuel injection mode through the injector 120 to a multi-stage injection mode, and then performs the learning injection to first inject the fuel for the set fuel injection time. Then, the controller 100 injects the fuel corresponding to the remaining injection amount obtained by excluding the injection amount, consumed for the learning injection, from the entire required injection amount to follow the learning injection. Through this, it is possible to perform the fuel injection for a specific injector injection time that is the target of learning.

Next, the controller 100 senses the actual closing time of the injector during the learning injection included in the multi-stage fuel injection by the injector 120 (S230). In one form of the present disclosure, in order to sense the actual closing time of the injector, the controller 100 uses the method for sensing the closing time of the injector using the artificial neural network (ANN) described above with reference to FIGS. 2 to 5. Through this, in the present disclosure, the controller 100 obtains data related to the relationship between the actual injector injection command time for each cylinder that is the target of learning and the closing time.

Next, in order to perform the learning at S240, the controller 100 derives the reliable result between the injector injection command time that is the target of learning and the closing time by repeatedly performing the measurement of the actual closing time of the injector 120 during the learning injection included in the multi-stage injection.

Next, after the learning at S240 is ended, the controller 100 compensates for the injector drive characteristics based on the result of the learning (S250).

For example, the controller 100 determines whether the actual measurement value of the injector closing time obtained by repeatedly performing the learning injection converges to a specific value or range. Further, if the actual measurement value of the injector closing time constantly converges to the specific value, the controller 100 determines whether the number of times of measurement of the injector closing time converging constantly as described above exceeds a predetermined first specific value. If the number of times of measurement of the injector closing time converging constantly to the specific value or range exceeds the first specific value, the controller 100 determines that the reliable relationship between the injector injection time and the closing time, being the target of learning, has been derived, and thus the learning has been completed. The controller 100 performs compensation by applying the relationship between the injector injection time and the closing time, derived through the result of the learning, to the injector drive characteristic curve for each cylinder (S250).

If the actual measurement value of the injector closing time obtained by repeatedly performing the learning injection does not converge to the specific value or range, the controller 100 counts the number of times of injection in a learning mode, and determines whether the number of times of injection in the learning mode exceeds a predetermined second set value. If the number of times of injection in the learning mode exceeds the second set value, the controller 100 determines that the learning of the injector closing time that is the target of the learning has failed, and thus ends the learning of the corresponding injector closing time without performing the learning any more.

According to the method for learning the closing time of the injector according to the present disclosure, it is possible to acquire the data related to the accurate injector drive characteristic related to the specific injector closing time for each cylinder that is the target, by performing the multi-stage injection including the learning injection to inject the fuel for the injector injection time that is the target of the learning in the case of the fuel injection using the injector and by measuring the actual closing time of the injector using the artificial neural network (ANN) in the case of the learning injection.

Through this, the accuracy of the learning for correcting the deviation of the injector closing time can be improved, and thus the correction of the fuel amount deviation between cylinders can also be improved.

While the present disclosure has been described with respect to the specific forms, it will be apparent to those skilled in the art that various changes and modifications may be made without departing from the spirit and scope of the disclosure as defined in the following claims.

What is claimed is:

1. A method for sensing a closing time of an injector using an artificial neural network, the method comprising:
   sensing, by a controller, a voltage generated by an injector;
   performing, by the controller, a preprocess to derive an input matrix using variation characteristics of the voltage; and
   performing, by the controller, a closing time prediction to derive a closing time of the injector by an artificial neural network model including an input layer including the input matrix, a hidden layer, and an output layer,
   wherein the variation characteristics of the voltage are a half-life constant of the voltage, and the half-life constant is a value calculated as:

$$k = -\frac{t}{\log_2 \frac{V_t}{V_0}}$$

where, $V_t$ is a voltage value V for each measurement point, $V_0$ is a voltage value at an initial measurement point, k is a half-life constant, and t is a time at a measurement point.

2. The method of claim 1, wherein performing the pre-process comprises:

calculating half-life constants at a plurality of measurement time points of the voltage in a specific section;

deriving an approximation polynomial for changes in the calculated half-life constants in accordance with the time; and deriving the input matrix by normalizing respective coefficients of the approximation polynomial.

3. The method of claim 2, wherein in deriving the approximation polynomial, the coefficients of the approximation polynomial are derived using a normal equation utilizing linear algebra.

4. The method of claim 2, wherein in performing the closing time prediction, the hidden layer derives a first preparation matrix by multiplying the normalized input matrix by a first weight matrix and adding a first bias matrix to the multiplied matrix, and the hidden layer derives a first resulting matrix by substituting a transfer function of the following equation for the first preparation matrix, $$a^1 = \frac{2}{1 + e^{-2n^1}} - 1$$

where, $a^1$ is the first resulting matrix, and $n^1$ is the first preparation matrix.

5. The method of claim 4, wherein in performing the closing time prediction, the output layer calculates a normalized closing time of the injector by multiplying the first resulting matrix by a second weight matrix and adding a bias value to the multiplied matrix, and the output layer calculates a final closing time of the injector by de-normalizing the calculated closing time of the injector.

* * * * *